(12) United States Patent
Oh et al.

(10) Patent No.: US 8,237,315 B2
(45) Date of Patent: Aug. 7, 2012

(54) STEP MOTOR

(75) Inventors: Seong-Kwan Oh, Incheon (KR);
Hyun-Ki Yang, Incheon (KR); Ki-Hwan Hong, Bucheon (KR); Hyuk-Sang Ahn, Incheon (KR)

(73) Assignee: Moatech Co., Ltd. (KR)

( * ) Notice: Subject to any disclaimer, the term of this patent is extended or adjusted under 35 U.S.C. 154(b) by 263 days.

(21) Appl. No.: 12/820,032

(22) Filed: Jun. 21, 2010

(65) Prior Publication Data
US 2011/0001367 A1 Jan. 6, 2011

(51) Int. Cl.
*H02K 37/00* (2006.01)
(52) U.S. Cl. ........................ 310/49.51; 310/71
(58) Field of Classification Search .............. 310/71, 310/49.51, 245.1, 261.1
See application file for complete search history.

(56) References Cited

U.S. PATENT DOCUMENTS

| | | | |
|---|---|---|---|
| 4,841,190 A * | 6/1989 | Matsushita et al. | 310/257 |
| 7,348,696 B2 * | 3/2008 | Sonohara et al. | 310/49.08 |
| 7,375,446 B2 * | 5/2008 | Suzuki et al. | 310/86 |
| 7,378,768 B2 * | 5/2008 | Ohkawa et al. | 310/71 |
| 7,446,442 B2 * | 11/2008 | Horiike | 310/49.07 |
| 2005/0236914 A1 * | 10/2005 | Horiike | 310/49 R |

* cited by examiner

*Primary Examiner* — Thanh Lam
(74) *Attorney, Agent, or Firm* — John K. Park; Park Law Firm

(57) ABSTRACT

Disclosed herein is a PM type step motor used to move a camera or an optical pickup lens of media related equipment. The step motor has a stator unit including first and second stators which butt against and are coupled to each other and each have a bobbin and a yoke attached thereto. Terminal blocks of the first and second stators are spaced apart from each other when the first and second stators are coupled to each other, thus allowing an automatic winding operation using winding equipment to be easily performed. The step motor includes a bushing which has in a central portion thereof a through hole through which a rotating shaft passes and is a two-stage structure having a small outer diameter part and a large outer diameter part, thus allowing the stator unit, the rotating shaft and a casing unit to easily be arranged coaxially.

16 Claims, 5 Drawing Sheets

STEP MOTOR

BACKGROUND OF THE INVENTION

1. Field of the Invention

The present invention relates generally to a PM (permanent magnet) type step motor used to move a camera or an optical pickup lens of media related equipment and, more particularly, to a step motor having a stator unit including first and second stators which butt against and are coupled to each other and each have a bobbin and a yoke attached thereto, wherein a terminal block of the first stator is spaced apart from a terminal block of the second stator when the first and second stators butt against and are coupled to each other, thus allowing an automatic winding operation using winding equipment to be easily performed, and the step motor includes a bushing which has in a central portion thereof a through hole through which a rotating shaft passes and is of a two-stage structure having a small outer diameter part and a large outer diameter part on an outer circumference thereof, thus allowing the stator unit, the rotating shaft and a casing unit to easily be arranged along a single axis.

2. Description of the Related Art

Generally, a PM (permanent magnet) type step motor includes a rotor to which magnets are attached, and a stator which is spaced apart from the outer circumferences of the magnets by a predetermined interval, so that the step motor rotates in response to an external electric signal applied to the stator.

The step motor includes the rotor and the stator, with a casing provided around the outer circumference of the stator to protect and cover the stator.

The rotor includes a plurality of magnets which are provided on the outer circumference of a rotating shaft and are magnetized such that their N and S poles alternate, the rotor being inserted into the inside of the stator. The stator includes a bobbin which receives the coil and yokes which have a plurality of yoke teeth inserted into the inside of the bobbin.

The yokes are constructed such that the plurality of yoke teeth face and engage with each other.

The magnetic path of the magnets is formed to pass through the yoke teeth which engage with each other, so that the rotor of the step motor is rotated by external power applied to the stator.

The step motor includes one pair of bobbins which are coupled to face each other. A terminal block protrudes from the upper portion of each bobbin, and protects a connection terminal pin which applies external power to the coil received in the bobbin.

As the miniaturization of the step motor is required, its outer diameter is reduced. Here, the conventional step motor is problematic in that conducting an automatic winding operation using winding equipment is very difficult, because there is an interval between connection terminals and there is a spatial limit imposed when the connection terminal block is installed.

SUMMARY OF THE INVENTION

Accordingly, the present invention has been made keeping in mind the above problems occurring in the prior art, and an object of the present invention is to provide a step motor including a stator unit having first and second stators which butt against and are coupled to each other and each have a bobbin and a yoke attached thereto, and a rotor unit which is inserted into the inside of the stator unit and has a magnet on the outer circumference of a rotating shaft to generate a rotating force, wherein terminal blocks protruding vertically from the upper ends of the first and second stators, respectively, are spaced apart from each other when the first and second stators butt against and are coupled to each other, thus allowing an automatic winding operation using winding equipment to be easily performed.

Another object of the present invention is to provide a step motor, including a bushing which has in a central portion thereof a through hole through which a rotating shaft passes and is of a two-stage structure having a small outer diameter part and a large outer diameter part, so that the large outer diameter part is inserted into a stator unit, the small outer diameter part is inserted into a coupling hole formed in the central portion of a side surface of a casing unit, and the rotating shaft passes through the through hole so as to be supported, thus allowing the stator unit, the rotating shaft and the casing unit to easily be coaxially arranged.

In order to accomplish the above objects, the present invention provides a step motor including a stator unit having first and second stators which butt against and are coupled to each other and each have a bobbin receiving a coil that generates a magnetic force when external power is applied thereto and a yoke attached to the bobbin, a rotor unit which is inserted into an inside of the stator unit and has a magnet mounted to an outer circumference of a rotating shaft, thus generating a rotating force, and a casing unit which is provided around an outer circumference of the stator unit to protect and cover the stator unit, wherein the first and second stators comprise terminal blocks which protrude vertically from upper ends thereof, and the terminal block of the first stator is spaced apart from the terminal block of the second stator when the first and second stators butt against and are coupled to each other.

In order to accomplish the above objects, the present invention provides a step motor including a stator unit having first and second stators which butt against and are coupled to each other and each have a bobbin receiving a coil that generates a magnetic force when external power is applied thereto and a yoke attached to the bobbin, a rotor unit which is inserted into an inside of the stator unit and has a magnet mounted to an outer circumference of a rotating shaft, thus generating a rotating force, and a casing unit which is provided around an outer circumference of the stator unit to protect and cover the stator unit, wherein a bushing which is used has a through hole in a central portion thereof and is of a two-stage structure having a small outer diameter part and a large outer diameter part on an outer circumference thereof, so that the large outer diameter part is inserted into the stator unit, the small outer diameter part is inserted into a coupling hole formed in a central portion of a side surface of the casing unit, and the rotating shaft passes through the through hole so that the rotating shaft is supported.

The stator unit may be one injection-molded product which is manufactured by insert molding such that the first and second stators each having the bobbin and the yoke attached thereto are integrated with each other.

The stator unit may be manufactured by separately insert molding each of the first and second stators having the bobbin and the yoke attached thereto, and thereafter assembling the insert molded first and second stators with each other such that the first and second stators butt against each other.

When the first and second stators are insert molded together, the terminal block and a terminal pin provided on the terminal block may be insert molded along with the first and second stators.

The terminal block of the first stator and the terminal block of the second stator may be spaced apart from each other by a predetermined interval and parallel to each other, when viewed in a direction perpendicular to the rotating shaft, and may overlap each other when viewed along a direction of the rotating shaft.

The casing unit may include two casings which are coupled to face each other, each of the casings being closed at a first side surface and open at a second side surface, with a coupling hole being formed in a central portion of the first side surface, and an outer circumference of each of the casings may be cut to a width of the terminal block, a cut length extending from a portion on which the terminal block is placed to the first side surface of the casing unit.

When viewed along a direction of the rotating shaft, an upper portion of the terminal block may be wide and a lower portion thereof may be narrow, so that each of the casings is fitted into the narrow lower portion.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a step motor according to the present invention will be described in detail with reference to the accompanying drawings.

Figure 1:
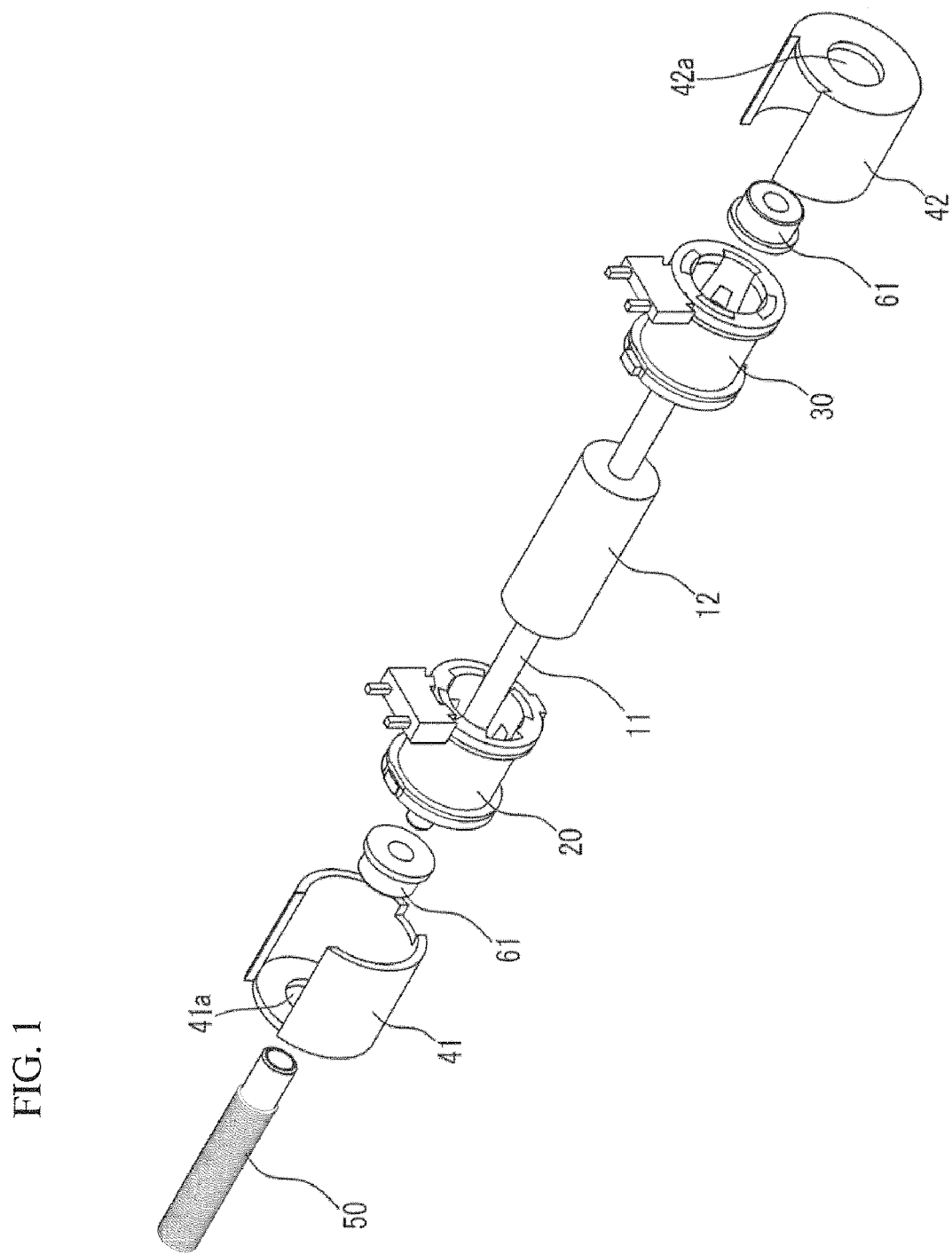
FIG. 1 is an exploded perspective view illustrating an entire step motor according to an embodiment of the present invention.
Figure 2:
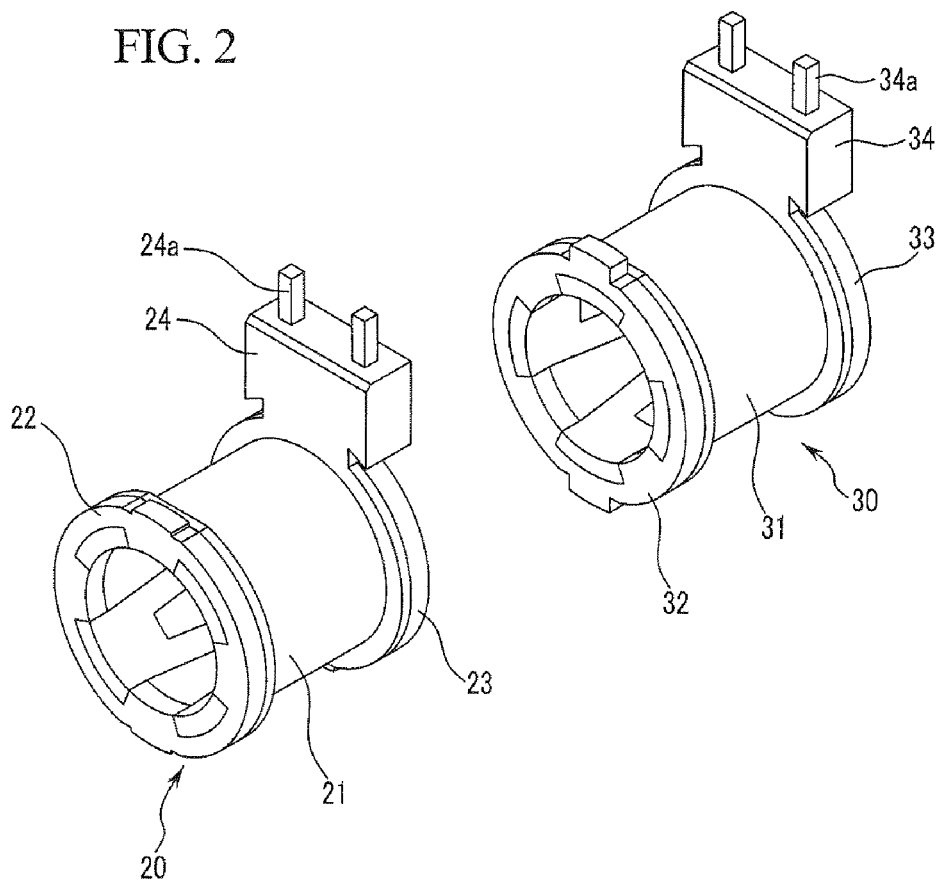
FIG. 2 is a detail view illustrating the structure of a stator unit according to the present invention.
Figure 3:
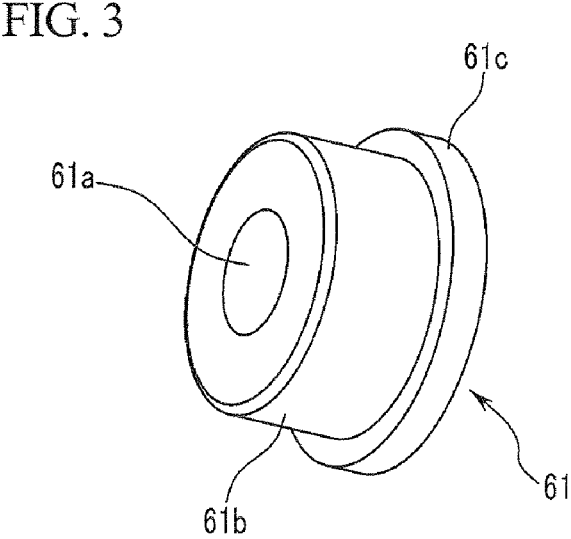
FIG. 3 is a detail view illustrating a bushing of the step motor according to the present invention.
Figure 4:
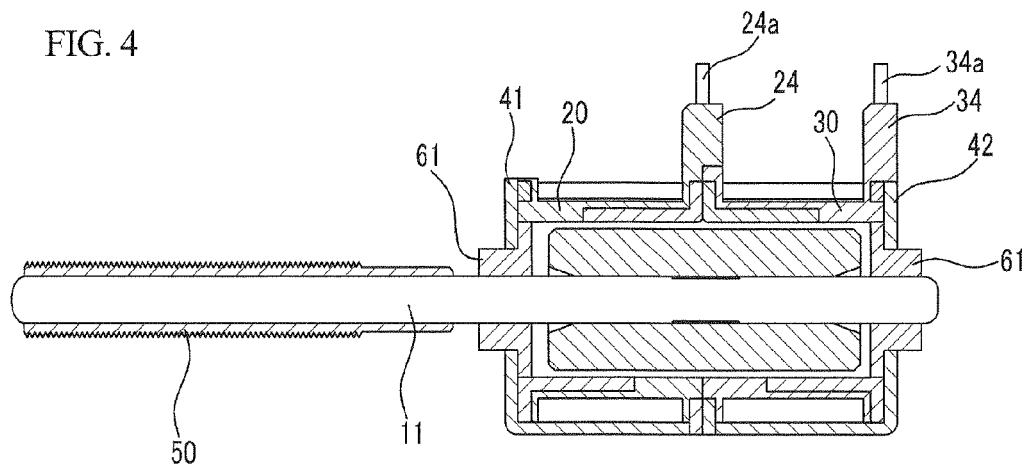
FIG. 4 is a sectional view illustrating the step motor according to the present invention.
Figure 5:
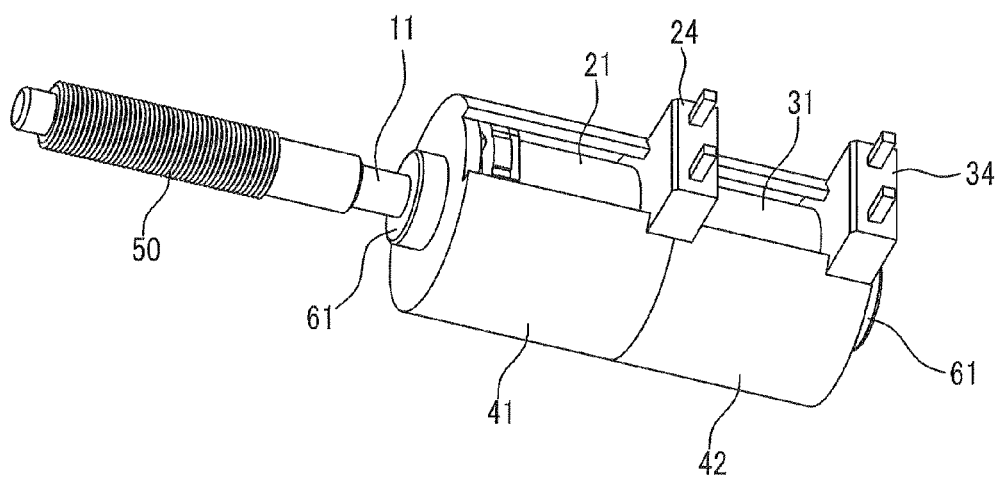
FIG. 5 is a perspective view illustrating the state in which the assembly of the step motor according to the present invention has been completed.

FIG. 1 is an exploded perspective view illustrating an entire step motor according to an embodiment of the present invention, FIG. 2 is a detail view illustrating the structure of a stator unit according to the present invention, FIG. 3 is a detail view illustrating a bushing of the step motor according to the present invention, FIG. 4 is a sectional view illustrating the step motor according to the present invention, and FIG. 5 is a perspective view illustrating the state in which the assembly of the step motor according to the present invention has been completed.

As shown in FIGS. 1 to 5, the step motor according to the present invention includes a stator unit, a rotor unit, casings 41 and 42, and a lead screw 50. The stator unit includes first and second stators 20 and 30 which butt against and are coupled to each other. The first stator 20 has a first bobbin 21 receiving a coil (not shown) that generates a magnetic force when external power is applied thereto, and first and second yokes 22 and 23 which are provided with a plurality of yoke teeth inserted into the first bobbin 21. The second stator 30 has a second bobbin 31, and first and second yokes 32 and 33 which are provided with a plurality of yoke teeth inserted into the second bobbin 31. The rotor unit is inserted into the inside of the stator unit, and is provided with a plurality of magnets 12 which are provided on the outer circumference of a rotating shaft and are magnetized such that their N and S poles alternate, thus generating a rotating force. The casings 41 and 42 are provided on the outer circumference of the stator unit to protect and cover the stator unit. The lead screw 50 is coupled to an end of the rotating shaft 11, and transmits the rotating force of the rotating shaft 11.

The first stator 20 comprises one injection-molded product which is manufactured by insert molding such that the first bobbin 21 and the first and second yokes 22 and 23 having the plurality yoke teeth inserted into the first bobbin 21 are integrated with each other. The second stator 30 also comprises one injection-molded product which is manufactured by insert molding such that the second bobbin 31 and the first and second yokes 32 and 33 having the plurality yoke teeth inserted into the second bobbin 31 are integrated with each other. Here, a terminal block 24 or 34 protruding vertically from an upper end of the first or second stator 20 or 30 and terminal pins 24a or 34a provided on the terminal block 24 or 34 may be integrally insert molded.

The first and second stators 20 and 30, manufactured by insert molding, butt against and are assembled with each other, thus providing one stator unit. After the assembly of the first and second stators 20 and 30 is done so, when viewing the stator unit in a direction perpendicular to the rotating shaft 11, the terminal blocks 24 and 34 provided on the upper ends of the first and second stators 20 and 30 are spaced apart from each other by a predetermined interval corresponding to the length of the bobbin and are arranged to be parallel to each other. When viewed along the direction of the rotating shaft 11, the terminal blocks 24 and 34 overlap.

When the first and second stators 20 and 30 are assembled as such, the terminal blocks 24 and 34 protruding vertically from the upper ends of the first and second stators 20 and 30 are spaced apart from each other by a predetermined interval, thus achieving a minimum terminal interval, therefore allowing an automatic winding operation using winding equipment to be easily conducted.

Meanwhile, a casing unit which is provided on the outer circumference of the stator unit to protect and cover the stator unit comprises two casings, that is, the first and second casings 41 and 42. Each of the first and second casings 41 and 42 has a closed first side surface and an open second side surface. A coupling hole 41a or 42a having a predetermined diameter is formed in the central portion of the first surface of the first or second casing 41 or 42. Here, the first and second casings 41 and 42 are coupled to face each other. The outer circumference of the casing 41 or 42 is cut to the width of the terminal block 24 or 34. The cut length extends from the terminal block 24 or 34 to the first surface of the casing 41 or 42.

Further, the terminal block 24 or 34 is shaped such that its upper portion is wide and its lower portion is narrow when viewed along the direction of the rotating shaft 11. The casing 41 or 42 is coupled to the narrow lower portion. Such a construction allows the casing 41 or 42 to be slidably coupled to the narrow portion of the terminal block 24 or 34. When the casing 41 or 42 has been coupled to the terminal block 24 or 34, as shown in FIG. 5, the terminal block 24 or 34 may overlap with part of the casing 41 or 42 so that the casing 41 or 42 may be more firmly coupled.

Meanwhile, the bushing 61 is inserted into the coupling hole 41a or 42a of each casing 41 or 42. As shown in FIGS. 1 to 5, the bushing 61 has at its central portion a through hole 61a through which the rotating shaft 11 passes, and has a two-stage structure which includes a small outer diameter part 61b and a large outer diameter part 61c on the outer circumference of the bushing 61. Preferably, the outer diameter of the small outer diameter part 61b is the same as the diameter of the coupling hole 41a or 42a of the casing 41 or 42, and the outer diameter of the large outer diameter part 61c is the same as the diameter of the inner circumference of the stator 20 or 30.

The large outer diameter part 61c of the bushing 61 is inserted into the stator 20 or 30, and the small outer diameter part 61b is inserted into the coupling hole 41a or 42b formed in the central portion of the first side surface of the casing 41 or 42. The rotating shaft 11 passes through the through hole 61a, so that the rotating shaft 11 is supported by the bushing 61. Such a construction allows the stator unit, the rotating shaft 11, and the casings 41 and 42 to easily be coaxially arranged using the bushings 61.

A step motor according to another embodiment of the present invention will be described below with reference to FIGS. 6 and 7.

Figure 6:
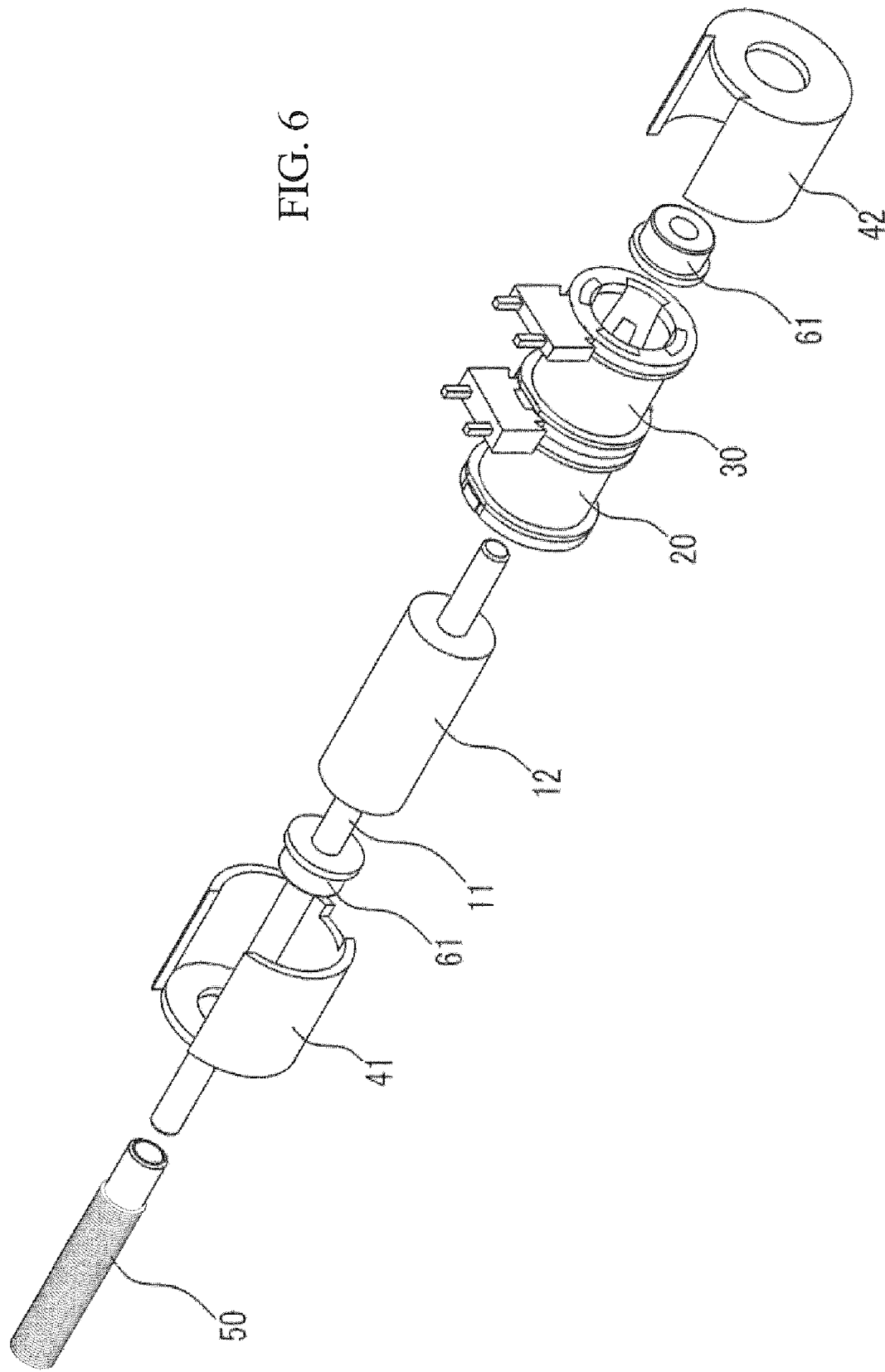
FIG. 6 is an exploded perspective view illustrating an entire step motor according to another embodiment of the present invention.
Figure 7:
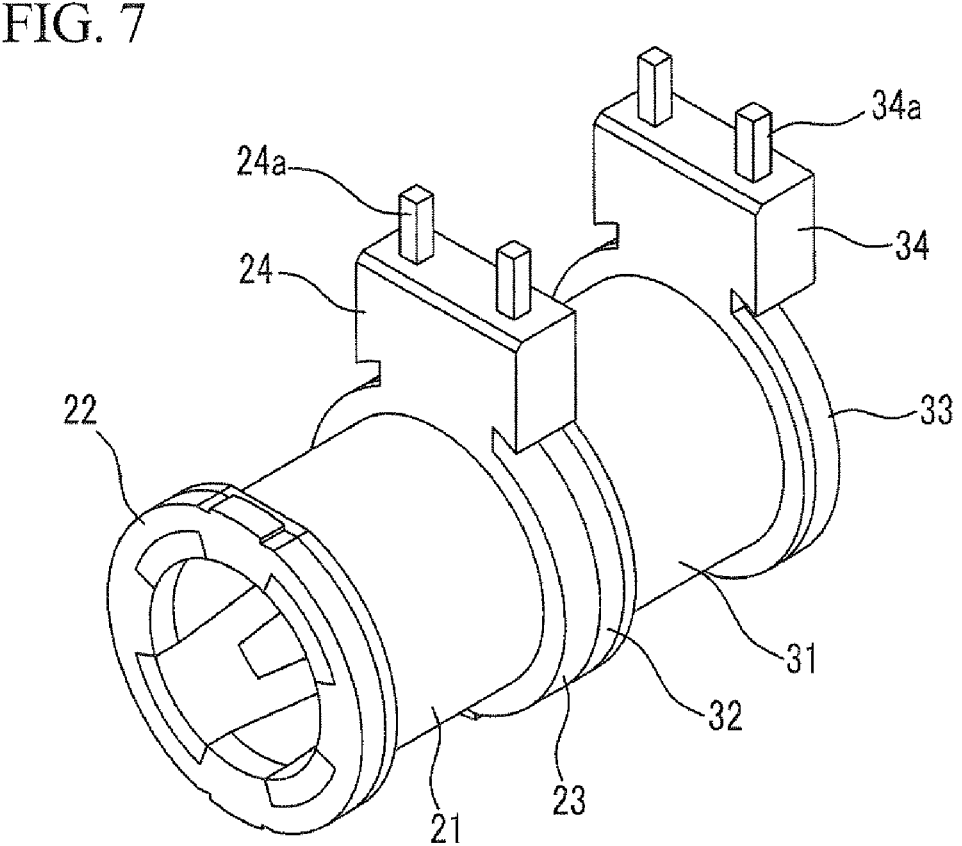
FIG. 7 is a detail view illustrating the structure of a stator unit of the step motor shown in FIG. 6.

FIG. 6 is an exploded perspective view illustrating an entire step motor according to another embodiment of the present invention, and FIG. 7 is a detail view illustrating the structure of a stator unit of the step motor shown in FIG. 6. As shown in FIGS. 6 and 7, the stator unit of the step motor comprises one injection-molded product which is manufactured by insert molding to integrally have a first stator 20 and a second stator 30. Here, the first stator 20 includes a first bobbin 21 and yokes 22 and 23 attached to the first bobbin 21. The second stator 20 includes a second bobbin 31 and yokes 32 and 33 attached to the second bobbin 31. Here, a terminal block 24 or 34 protruding vertically from an upper end of each of the first and second stators 20 and 30 and terminal pins 24a or 34a provided on the terminal block 24 or 34 may be integrally insert molded.

As such, the entire stator comprises one injection-molded product, thus simplifying assembly parts and reducing the number of manufacturing processes, and the terminal blocks 24 and 34 provided on the stators 20 and 30 are spaced apart from each other by a predetermined interval, thus achieving a minimum terminal interval, therefore allowing an automatic winding operation using winding equipment to be easily performed.

As described above, the present invention provides a step motor including a stator unit having first and second stators which butt against and are coupled to each other and each have a bobbin and a yoke attached thereto, and a rotor unit which is inserted into the inside of the stator unit and has a magnet on the outer circumference of a rotating shaft to generate a rotating force, wherein terminal blocks protruding vertically from the upper ends of the first and second stators, respectively, are spaced apart from each other when the first and second stators butt against and are coupled to each other, thus making it easy to install the terminal blocks and providing a minimum terminal interval, and thereby allowing an automatic winding operation using winding equipment to be easily performed, therefore resulting in high productivity.

The present invention provides a step motor, including a bushing which has in a central portion thereof a through hole through which a rotating shaft passes and is of a two-stage structure having a small outer diameter part and a large outer diameter part, so that the large outer diameter part is inserted into a stator unit, the small outer diameter part is inserted into a coupling hole formed in the central portion of a side surface of a casing unit, and the rotating shaft passes through the through hole so as to be supported, thus allowing the stator unit, the rotating shaft and the casing unit to easily be coaxially arranged.

Further, the present invention provides a step motor, in which bobbins, yokes and terminal blocks of first and second stators are integrally insert molded, so that assembly parts are simplified and thus the number of manufacturing processes is reduced. As a result, the quality of the step motor is improved, and the manufacturing cost thereof is reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A step motor including a stator unit having first and second stators which butt against and are coupled to each other and each have a bobbin receiving a coil that generates a magnetic force when external power is applied thereto and a yoke attached to the bobbin, a rotor unit which is inserted into an inside of the stator unit and has a magnet mounted to an outer circumference of a rotating shaft, thus generating a rotating force, and a casing unit which is provided around an outer circumference of the stator unit to protect and cover the stator unit,
    wherein the first and second stators comprise terminal blocks which protrude vertically from upper ends thereof, and the terminal block of the first stator is spaced apart from the terminal block of the second stator when the first and second stators butt against and are coupled to each other.

2. The step motor as set forth in claim 1, wherein the stator unit comprises one injection-molded product which is manufactured by insert molding such that the first and second stators each having the bobbin and the yoke attached thereto are integrated with each other.

3. The step motor as set forth in claim 2, wherein, when the first and second stators are insert molded together, the terminal block and a terminal pin provided on the terminal block are insert molded along with the first and second stators.

4. The step motor as set forth in claim 1, wherein the stator unit is manufactured by separately insert molding each of the first and second stators having the bobbin and the yoke attached thereto, and thereafter assembling the insert molded first and second stators with each other such that the first and second stators butt against each other.

5. The step motor as set forth in claim 4, wherein, when each of the first and second stators is insert molded separately, the terminal block and a terminal pin provided on the terminal block are insert molded along with each of the first and second stators.

6. The step motor as set forth in claim 1, wherein a bushing which is used has a through hole in a central portion thereof and is of a two-stage structure having a small outer diameter part and a large outer diameter part on an outer circumference thereof, so that the large outer diameter part is inserted into the stator unit, the small outer diameter part is inserted into a coupling hole formed in a central portion of a side surface of the casing unit, and the rotating shaft passes through the through hole so that the rotating shaft is supported.

7. The step motor as set forth in claim 6, wherein the terminal block of the first stator and the terminal block of the second stator are spaced apart from each other by a predetermined interval and parallel to each other, when viewed in a direction perpendicular to the rotating shaft, and overlap each other when viewed along a direction of the rotating shaft.

8. The step motor as set forth in claim 6, wherein the casing unit comprises two casings which are coupled to face each other, each of the casings being closed at a first side surface and open at a second side surface, with a coupling hole being formed in a central portion of the first side surface, and an outer circumference of each of the casings is cut to a width of the terminal block, a cut length extending from a portion on which the terminal block is placed to the first side surface of the casing unit.

9. The step motor as set forth in claim 1, wherein the terminal block of the first stator and the terminal block of the second stator are spaced apart from each other by a predetermined interval and parallel to each other, when viewed in a direction perpendicular to the rotating shaft, and overlap each other when viewed along a direction of the rotating shaft.

10. The step motor as set forth in claim 1, wherein the casing unit comprises two casings which are coupled to face each other, each of the casings being closed at a first side surface and open at a second side surface, with a coupling hole being formed in a central portion of the first side surface, and an outer circumference of each of the casings is cut to a width of the terminal block, a cut length extending from a portion on which the terminal block is placed to the first side surface of the casing unit.

11. The step motor as set forth in claim 1, wherein, when viewed along a direction of the rotating shaft, an upper portion of the terminal block is wide and a lower portion thereof is narrow, so that each of the casings is fitted into the narrow lower portion.

12. A step motor including a stator unit having first and second stators which butt against and are coupled to each other and each have a bobbin receiving a coil that generates a magnetic force when external power is applied thereto and a yoke attached to the bobbin, a rotor unit which is inserted into an inside of the stator unit and has a magnet mounted to an outer circumference of a rotating shaft, thus generating a rotating force, and a casing unit which is provided around an outer circumference of the stator unit to protect and cover the stator unit, wherein a bushing which is used has a through hole in a central portion thereof and is of a two-stage structure having a small outer diameter part and a large outer diameter part on an outer circumference thereof, so that the large outer diameter part is inserted into the stator unit, the small outer diameter part is inserted into a coupling hole formed in a central portion of a side surface of the casing unit, and the rotating shaft passes through the through hole so that the rotating shaft is supported.

13. The step motor as set forth in claim 12, wherein the stator unit comprises one injection-molded product which is manufactured by insert molding such that the first and second stators each having the bobbin and the yoke attached thereto are integrated with each other.

14. The step motor as set forth in claim 13, wherein, when the first and second stators are insert molded together, the terminal block and a terminal pin provided on the terminal block are insert molded along with the first and second stators.

15. The step motor as set forth in claim 12, wherein the stator unit is manufactured by separately insert molding each of the first and second stators having the bobbin and the yoke attached thereto, and thereafter assembling the insert molded first and second stators with each other such that the first and second stators butt against each other.

16. The step motor as set forth in claim 15, wherein, when each of the first and second stators is insert molded separately, the terminal block and a terminal pin provided on the terminal block are insert molded along with each of the first and second stators.

* * * * *